(12) United States Patent
Zou et al.

(10) Patent No.: US 12,368,307 B2
(45) Date of Patent: Jul. 22, 2025

(54) BATTERY MANAGEMENT SYSTEM (71) Applicant: Huawei Digital Power Technologies Co., Ltd., Shenzhen (CN)

(72) Inventors: Zhenghua Zou, Dongguan (CN); Yuxiang Li, Xi'an (CN); Zhipeng Wu, Shenzhen (CN); Shijiang Yu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 732 days.

(21) Appl. No.: 17/704,893

(22) Filed: Mar. 25, 2022

(65) Prior Publication Data
US 2022/0311252 A1    Sep. 29, 2022

(30) Foreign Application Priority Data

Mar. 26, 2021   (CN) .......................... 202110325188.7

(51) Int. Cl.
*H02J 7/00* (2006.01)
(52) U.S. Cl.
CPC ........ *H02J 7/0031* (2013.01); *H02J 7/00308* (2020.01); *H02J 7/00309* (2020.01); *H02J 7/0047* (2013.01); *H02J 7/007182* (2020.01); *H02J 7/007194* (2020.01); *H02J 2207/20* (2020.01)

(58) Field of Classification Search
USPC ........................................ 320/134
See application file for complete search history.

(56) References Cited

U.S. PATENT DOCUMENTS

| | | | |
|---|---|---|---|
| 2005/0162129 A1 | 7/2005 | Mutabdzija et al. | |
| 2013/0293020 A1* | 11/2013 | Shim | H02J 7/34 429/93 |
| 2018/0226812 A1* | 8/2018 | Hanada | H01M 10/441 |
| 2019/0168632 A1* | 6/2019 | Deng | B60L 50/64 |

FOREIGN PATENT DOCUMENTS

| | | |
|---|---|---|
| CN | 101834457 A | 9/2010 |
| CN | 110690818 A | 1/2020 |
| CN | 210607519 U | 5/2020 |
| CN | 111244996 A | 6/2020 |
| EP | 3319197 A1 | 5/2018 |
| EP | 3498521 A1 | 6/2019 |
| JP | 2002354814 A | 12/2002 |

* cited by examiner

*Primary Examiner* — Samuel Berhanu
(74) *Attorney, Agent, or Firm* — WOMBLE BOND DICKINSON (US) LLP (57) ABSTRACT

A battery management system is provided in this application, which includes a monitoring module and a sampling module. The sampling module performs sampling on an operating parameter of a direct current converter to obtain target sampling information, and sends the target sampling information to the monitoring module. The monitoring module receives the target sampling information sent by the sampling module, and sends the target sampling information to a central monitoring unit, so that the central monitoring unit determines target charge power for charging an energy storage battery by a power conversion system PCS; and receives a first control instruction sent by the central monitoring unit, and controls the direct current converter to adjust charge power for charging the energy storage battery by the power conversion system PCS to the target charge power.

20 Claims, 7 Drawing Sheets

BATTERY MANAGEMENT SYSTEM

CROSS-REFERENCE TO RELATED APPLICATIONS

This application claims priority to Chinese Patent Application No. 202110325188.7, filed on Mar. 26, 2021, which is hereby incorporated by reference in its entirety.

TECHNICAL FIELD

This application relates to the field of energy storage technologies, and in particular, to a battery management system.

BACKGROUND

To overcome a problem of severe intermittency of large-scale photovoltaic power generation and wind power generation, in recent years, energy storage technologies at home and abroad are developed rapidly, and container energy storage systems are widely used as energy storage power supplies for power supply in the foregoing scenarios due to advantages such as application flexibility, high reliability, and high energy density of the container energy storage systems. When the container energy storage systems are used as the energy storage power supplies for power supply, usability and stability of an entire power supply system can be greatly improved. This is a future development direction of energy storage. A battery management system is used to perform charge and discharge management on an energy storage battery in the container energy storage system, to complete alternating current to direct current conversion or direct current to alternating current conversion.

Figure 1:
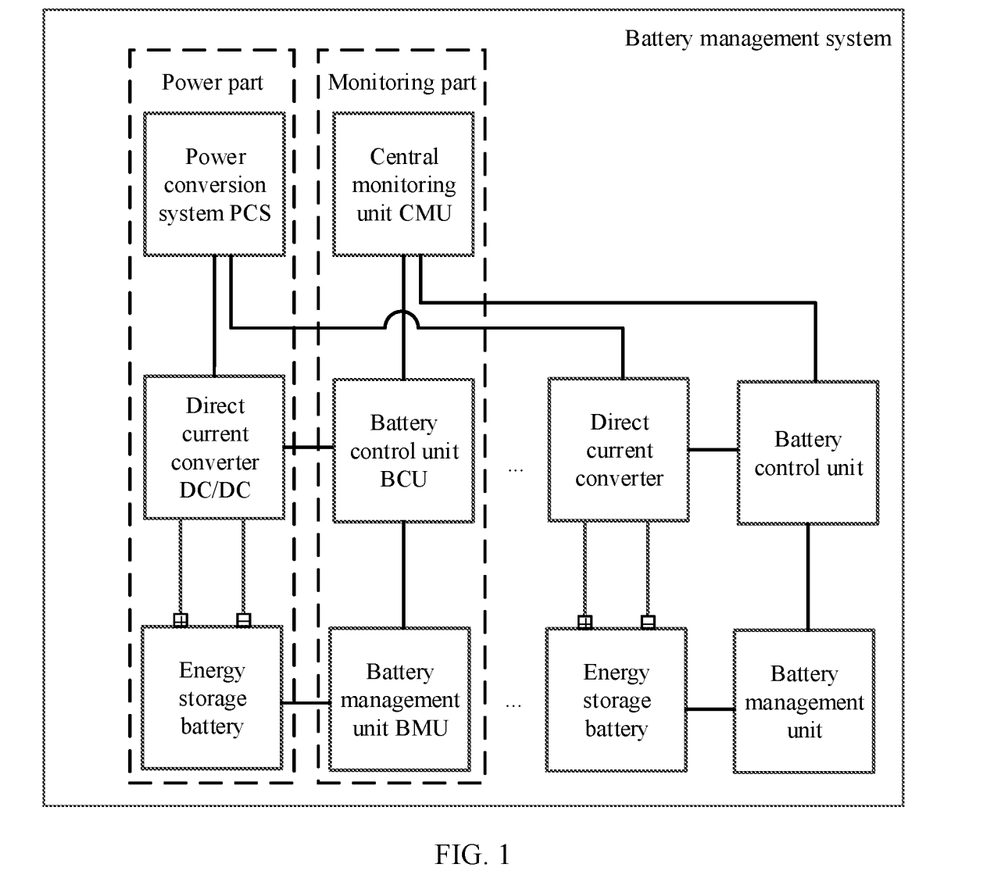
FIG. 1 is a schematic diagram of a structure of a current battery management system, according to some embodiments.

A schematic diagram of a current battery management system may be shown in FIG. 1. The battery management system is divided into a power part and a monitoring part. The power part includes an energy storage battery, a direct current-direct current (DC-DC) converter, and a power conversion system (PCS). The monitoring part of the battery management system includes a central monitoring unit (CMU), a battery control unit (BCU), and a battery management unit (BMU).

The CMU is configured to implement environmental data collection and an entire central management function. The BCU is configured to: detect the BMU and manage the DC-DC converter. The BMU is configured to: implement passive equalization on a cell level energy storage battery and active equalization on a battery pack level energy storage battery, and estimate a state of a battery.

However, in the foregoing battery management system, power needs to be supplied to each BCU independently, and a plurality of BCUs each need to be provided with an independent space. In addition, when the BCU manages the DC-DC, a communications line needs to be provided between each BCU and each DC-DC. Therefore, a relatively large space is occupied. Costs of the entire battery management system are also relatively high. In view of this, how to save the space of the battery management system and reduce costs of the battery management system is a problem that urgently needs to be resolved in this field.

SUMMARY

This application provides a battery management system, to save a space of the battery management system and reduce costs of the battery management system.

One or more embodiments of this application provide a battery management system, including an energy storage battery, a power conversion system PCS, a central monitoring unit, and/or a direct current converter. The battery management system further includes a monitoring module and/or a sampling module, an input terminal of the direct current converter is connected to the power conversion system PCS, and/or an output terminal of the direct current converter is connected to the energy storage battery. In some embodiments, the direct current converter, the sampling module, and/or the monitoring module are integrated on a same printed circuit board PCB. The sampling module is configured to: perform (e.g., execute, run) sampling on an operating parameter of the direct current converter to obtain target sampling information, and/or send the target sampling information to the monitoring module. The monitoring module is configured to: receive the target sampling information sent by the sampling module, and send the target sampling information to the central monitoring unit, so that the central monitoring unit determines, based on the target sampling information, target charge power for charging the energy storage battery by the power conversion system PCS; and/or receive a first control instruction sent by the central monitoring unit, and/or control, according to the first control instruction, the direct current converter to adjust (e.g., modify, control) charge power for charging the energy storage battery by the power conversion system PCS to the target charge power.

Based on the module design in the foregoing battery management system, a space of the battery management system can be saved and costs of the battery management system can be reduced. In some embodiments, the direct current converter, the sampling module, and/or the monitoring module are integrated on the same printed circuit board PCB, so that the battery management system can further detect the operating parameter of the direct current converter by using the monitoring module and the sampling module on the premise of implementing a direct current conversion function, and/or adjust the charge power for charging the energy storage battery by the power conversion system PCS. Therefore, in this solution, costs of hardwired cabling between the direct current converter and a battery management unit in the battery management system can be reduced, and the space of the entire battery management system is finally saved.

In some embodiments, the monitoring module of the battery management system may be further configured to: receive a second control instruction sent by the central monitoring unit, and/or control, according to the second control instruction, the direct current converter to adjust discharge power for discharging the energy storage battery to the power conversion system PCS to target discharge power. In this manner, when determining that a working state of the energy storage battery is a discharge state, the central monitoring unit may send the second control instruction to the monitoring module, so that the direct current converter adjusts the discharge power for discharging the energy storage battery to the power conversion system PCS to the target discharge power. In this way, in a discharge scenario, output power of the energy storage battery is converted into charge power adapted to a to-be-charged device.

In some embodiments, the target sampling information may include a current value of the energy storage battery that is input from the direct current converter, a voltage value of the energy storage battery that is input from the direct current converter, and/or insulation impedance of the energy storage battery. In some embodiments, the sampling module may include an input current sampling circuit, an input voltage sampling circuit, and/or an insulation detection circuit. The input current sampling circuit is configured to collect (e.g., gather, acquire, sense) the current value of the energy storage battery that is input by the direct current converter. The input voltage sampling circuit is configured to collect the voltage value of the energy storage battery that is input by the direct current converter. The insulation detection circuit is configured to collect the insulation impedance of the energy storage battery.

The input current sampling circuit is configured to collect the current value of the energy storage battery that is input by the direct current converter. In some embodiments, the input current sampling circuit may include a current transformer, and the current transformer is an instrument that converts a high current on a primary side into a low current on a secondary side based on an electromagnetic induction principle. The current transformer is sleeved on an electrical connection line between the direct current converter and the energy storage battery, and a current of the electrical connection line is detected by using an electromagnetic mutual inductance principle. In some embodiments, a magnetic field is generated around the electrical connection line. After the current transformer is sleeved on the electrical connection line, a coil on the current transformer generates an induced current due to the magnetic field of the electrical connection line. After the induced current is amplified, the input current value of the energy storage battery can be obtained. The input voltage sampling circuit is configured to collect the voltage value of the energy storage battery that is input by the direct current converter. In some embodiments, the direct current converter includes a positive input terminal and a negative input terminal, and the input voltage sampling circuit is coupled to the positive input terminal and the negative input terminal of the direct current converter, to obtain the input voltage value of the energy storage battery. The insulation detection circuit is configured to collect the insulation impedance of the energy storage battery. By using the foregoing structure, the target sampling information can be obtained by monitoring the operating parameter of the energy storage battery, the sampling module uploads the target sampling information to the monitoring module, and the monitoring module forwards the target sampling information to the central monitoring unit, so that the central monitoring unit implements functions of SOX estimation, equalization, protection, and control for the energy storage battery based on the target sampling information.

In some embodiments, the battery management system may further include a power obtaining module. The power obtaining module is configured to: generate an induced current based on an actual current in the direct current converter, generate a power supply current by using the induced current, and supply power to the monitoring module. By using the structure, related power supply to the monitoring module can be integrated in the direct current converter, to reduce power supply costs.

In some embodiments, the battery management system may further include a shutdown control module. The monitoring module is further configured to: send a shutdown instruction to the shutdown control module if the first control instruction sent by the central monitoring unit is not received within target duration after the first sampling information is sent to the central monitoring unit. The shutdown control module is configured to: break a connection between the direct current converter and the energy storage battery after receiving the shutdown instruction sent by the monitoring module. By using the structure, if the first control instruction sent by the central monitoring unit is not received within the target duration, it indicates that a communications connection between the central monitoring unit and the monitoring module may be lost. In this case, the energy storage battery cannot be controlled by the central monitoring unit. To protect energy storage battery, a control switch needs to be disconnected, to protect the energy storage battery.

In some embodiments, the battery management system may further include a temperature detection module. The temperature detection module is configured to: detect a temperature of the energy storage battery to obtain the temperature of the energy storage battery, and send the temperature of the energy storage battery to the monitoring module; and the monitoring module is further configured to send the shutdown instruction to the shutdown control module when the temperature of the energy storage battery is greater than a temperature threshold. By using the structure, it can be ensured that battery protection is started when the temperature of the battery or an ambient temperature of the battery is not within a proper temperature range, so that the shutdown control module sends the shutdown instruction, to protect the energy storage battery.

In some embodiments, the battery management system may further include a battery voltage detection module. The battery voltage detection module is configured to: detect a voltage of the energy storage battery to obtain the voltage of the energy storage battery, and send the voltage of the energy storage battery to the monitoring module; and the monitoring module is further configured to send the shutdown instruction to the shutdown control module when the voltage of the energy storage battery is not within a preset voltage range, so that the battery does not supply power to an external powered device during undervoltage, to prolong service life of the energy storage battery.

In some embodiments, the monitoring module and the central monitoring unit in the battery management system may communicate with each other through any one of the following networks: a controller area network CAN and a fast Ethernet FE. In some embodiments, the monitoring module may transmit data to the central monitoring unit through the CAN or the fast Ethernet. In addition, the monitoring module may also establish a connection to the central monitoring unit in manners such as an RS485 interface, an optical fiber, power line communication or 5G/4G/3G/2G networks, a general packet radio service, wireless fidelity, Bluetooth, ZigBee, and infrared.

DESCRIPTION OF EMBODIMENTS

The following describes some terms in embodiments of this application to help persons skilled in the art have a better understanding.

(1) A battery management system (BMS) is an important part of an energy storage system. The battery management system can obtain a current state of a battery by monitoring and estimating the battery online, and can also perform battery equalization based on the current state and some algorithms, to implement functions such as battery thermal management and deep charge/discharge protection.

(2) A battery management unit (BMU) is configured to: monitor information such as a voltage and a temperature of an energy storage battery in the energy storage system, and report the information to a battery control unit (BCU) through a communications bus. Further, the battery control unit monitors and adjusts the energy storage battery in the battery management system based on the information reported by the battery management unit. In addition, when there are a plurality of battery management units in the battery management system, to enable the battery control unit to distinguish which battery management unit reports the received information, each battery management unit is numbered independently.

(3) A central monitoring unit (CMU) is configured to implement environmental data collection and an entire central management function.

(4) A state of X (SOX) includes a state of charge (SOC), a state of health (SOH), and a state of power (SOP), where the SOX is obtained for estimating a management instruction. The management instruction includes charge time, discharge time, charge power, and discharge power, and none of a quantity of times of charging based on the charge time, a quantity of times of discharging based on the discharge time, the charge power, and the discharge power exceeds specified boundary values of charge and discharge management. The specified boundary values of charge and discharge management include a boundary value of the quantity of times of charging, a boundary value of the quantity of times of discharging, a boundary value of the charge power, and a boundary value of the discharge power that are allowed in a current state of the energy storage battery.

(5) Battery equalization: Voltages on ends of batteries are imbalanced due to individual differences and temperature differences between the batteries during use of the batteries. To avoid deterioration of the imbalance trend, a charge voltage of a battery pack needs to be increased to charge the batteries in an equalized manner, to equalize characteristics of battery cells in the battery pack, thereby prolonging service life of the batteries. Battery equalization is further classified into passive equalization and active equalization. The passive equalization means consuming electric energy in an energy storage battery by using a principle of resistor heating and discharging, to implement equalization. The active equalization means electric energy equalization without consumption, and electric energy is transferred by using capacitance, inductance, or the like. The active equalization can not only reduce a difference between energy storage batteries, but also greatly prolong the service life of the energy storage batteries through proper charging and discharging based on an electric capacity of a single energy storage battery.

To make objectives, technical solutions, and advantages of this application clearer, the following further describes this application in detail with reference to the accompanying drawings.

It should be noted that, in description of this application, "at least one" means one or more, and "a plurality of" means two or more. In embodiments of this application, "a plurality of" may also be understood as "at least two". The term "and/or" describes an association relationship between associated objects and indicates that three relationships may exist. For example, A and/or B may represent the following three cases: Only A exists, both A and B exist, and only B exists. In addition, the character "/" generally indicates an "or" relationship between the associated objects unless specified otherwise. In addition, it should be understood that in description of this application, words such as "first" and "second" are merely intended for differentiation and description, and should not be understood as indicating or implying relative importance or a sequence.

To overcome a problem of severe intermittency of large-scale photovoltaic power generation and wind power generation, container energy storage systems are widely used as energy storage power supplies for power supply in the foregoing scenarios due to advantages such as application flexibility, high reliability, and high energy density of the container energy storage systems. In some embodiments, it is difficult for a current power generation system to meet a flexible operation requirement of a power grid due to continuous increase of load demands during peak periods. This requires various energy storage systems to add supplements, to participate in regulation and operation of the power grid and support safe and stable operation of the power grid. The container energy storage system is mainly used for capacity expansion and peak cutting and valley filling. Peak cutting and valley filling can reduce expenses of industrial electricity consumption and also reduce pressure on a power system during peak periods.

A battery management system is mainly divided into a power part and a monitoring part. As shown in FIG. 1, the power part includes a plurality of energy storage batteries, a plurality of direct current converters, and a power conversion system (PCS). The monitoring part includes a central monitoring unit, a plurality of battery control units, and a plurality of battery management units.

The power conversion system PCS in the power part is configured to control the direct current converters, so that the direct current converters charge and discharge the energy storage batteries. After receiving a control instruction, the power conversion system adjusts output power of each direct current converter based on power indicated by the control instruction, so that an energy storage battery corresponding to the direct current converter is charged or discharged, and power may be directly supplied to an alternating current load when a power grid is disconnected. The direct current converter is configured to convert input electric energy of the power conversion system or the energy storage battery into specified voltage and current values for output. The energy storage battery is configured to directly store electric energy when the electric energy is sufficient (e.g., during a power consumption valley), and when power supply is required (e.g., during a power consumption peak), the energy storage battery discharges the stored electric energy.

The central monitoring unit is configured to implement environmental data collection and a container management function. For example, energy storage batteries in a container are centrally controlled by using an operating temperature/humidity of the container, and the battery control unit is configured to: detect the battery management unit and manage the direct current converter, and implement SOX estimation of a single energy storage battery and protection of the single energy storage battery. For example, when a communications connection between an energy storage battery and the central monitoring unit is lost, a connection between the energy storage battery and the direct current converter is broken, to protect the energy storage battery and prolong service life of the energy storage battery. The battery management unit is configured to implement passive equalization of a cell level energy storage battery and active equalization of a battery pack level energy storage battery. Performance of the energy storage battery is greatly affected by temperature, especially under a low temperature condition, a charge capacity, charge and discharge rates, and service life of the energy storage battery are all greatly reduced. Therefore, under the low temperature condition, only low-power charging and discharging can be performed. In some examples, the central monitoring unit may include a temperature sensor, a humidity sensor, and the like, to collect environmental data (e.g., an ambient temperature, an ambient humidity, and the like).

In the foregoing battery management system, there are usually a plurality of battery control units to control the direct current converters, power needs to be supplied to each battery control unit independently, and the plurality of battery control units each need to be disposed in an independent space. Therefore, when the battery control units manage the direct current converters, a communications line needs to be disposed between each battery control unit and each direct current converter. Therefore, a space occupied by the battery management system is relatively large, costs are also increased, and how to save the space of the battery management system and reduce the costs of the battery management system is a problem that urgently needs to be resolved in this field.

In view of this, this application provides a battery management system. In the battery management system of this application, a direct current converter, a sampling module, and a monitoring module are integrated on a same printed circuit board PCB, so that the battery management system can further detect an operating parameter of the direct current converter by using the monitoring module and the sampling module on the premise of implementing a direct current conversion function, to adjust charge power. Therefore, in this solution, costs of hardwired cabling between the direct current converter and a battery management unit in the battery management system can be reduced, and a space of the entire battery management system is finally saved. In addition, power supply to the monitoring module may be integrated on the direct current converter, and a related protection function may also be integrated onto the direct current converter, to save the space of the entire battery management system.

Figure 2A:
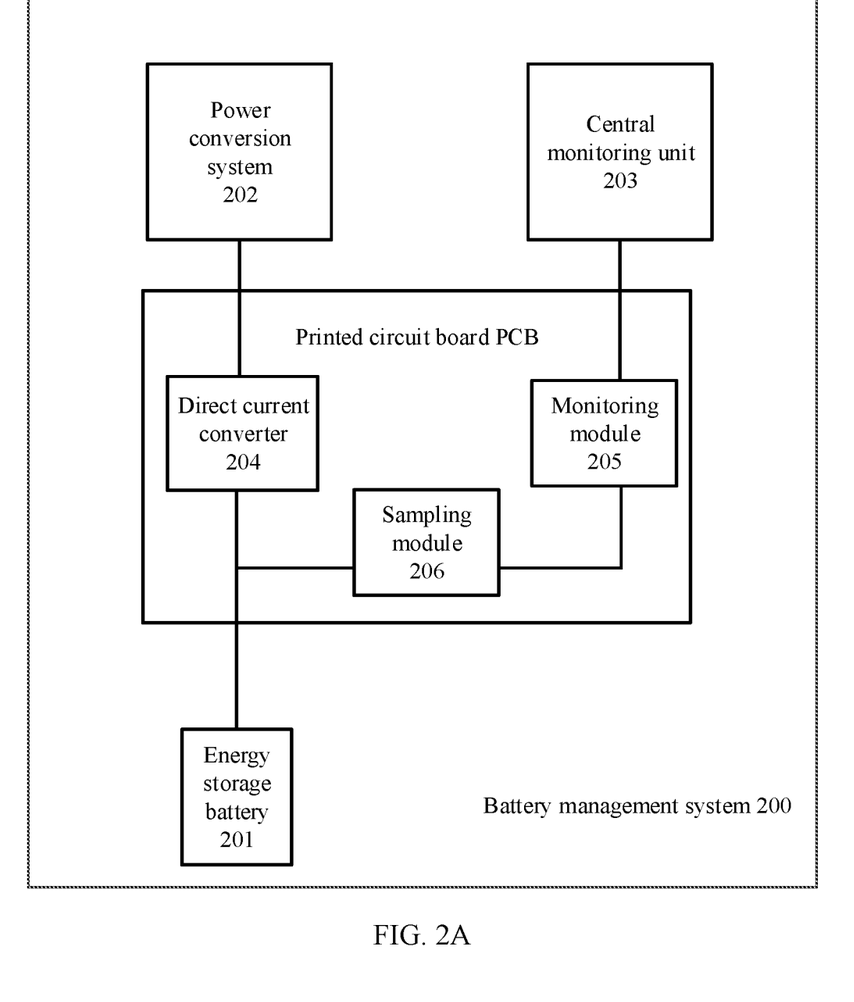
FIG. 2A is a schematic diagram of a structure of a battery management system, according to some embodiments.

FIG. 2A shows a battery management system 200 according to an embodiment of this application. The battery management system 200 includes an energy storage battery 201, a power conversion system PCS 202, a central monitoring unit 203, and a direct current converter 204. The battery management system 200 further includes a monitoring module 205 and a sampling module 206, an input terminal of the direct current converter 204 is connected to the power conversion system PCS 202, and an output terminal of the direct current converter 204 is connected to the energy storage battery 201. The direct current converter 204, the monitoring module 205, and the sampling module 206 are integrated on a same printed circuit board PCB.

In this embodiment of this application, the direct current converter 204 is configured to receive a first control instruction forwarded by the monitoring module 205, and adjust, according to the first control instruction, charge power for charging the energy storage battery 201 by the power conversion system PCS 202 to target charge power.

The sampling module 206 is configured to: perform sampling on an operating parameter of the direct current converter 204 to obtain target sampling information, and send the target sampling information to the monitoring module 205.

The monitoring module 205 is configured to: receive the target sampling information sent by the sampling module 206, and send the target sampling information to the central monitoring unit 203, so that the central monitoring unit 203 determines, based on the target sampling information, target charge power for charging the energy storage battery 201 by the power conversion system PCS 202; and receive a first control instruction sent by the central monitoring unit 203, and control, according to the first control instruction, the direct current converter 204 to adjust charge power for charging the energy storage battery 201 by the power conversion system PCS 202 to the target charge power.

For example, the energy storage battery 201 may include one or more lithium batteries, lead acid batteries, or lithium iron phosphate batteries. The lithium iron phosphate battery has relatively high safety, so that the energy storage battery is not exploded or burned due to overcharge, overdischarge, overheat, short circuit, and impact, and does not contain heavy metals and rare metals, and is nontoxic and pollution-free.

In some embodiments, the direct current converter 204 includes at least one switch device, at least one inductor, and at least one capacitor, and the direct current converter 204 may be a power conversion circuit, for example, a two-level chopper boost circuit or a fly-capacitor three-level chopper boost circuit.

It should be noted that the switch device in this embodiment of this application may be one or more of switching transistors of a plurality of types such as a relay, a metal oxide semiconductor field effect transistor (MOSFET), a bipolar junction transistor (BJT), and an insulated gate bipolar transistor (IGBT). Exhaustive listing is not performed in this embodiment of this application. Each switch device may include a first electrode, a second electrode, and a control electrode, where the control electrode is configured to control closing or disconnection of the switch device. When the switch device is closed, a current may be transmitted between the first electrode and the second electrode of the switch device, and when the switch device is disconnected, a current cannot be transmitted between the first electrode and the second electrode of the switch device.

Figure 2B:
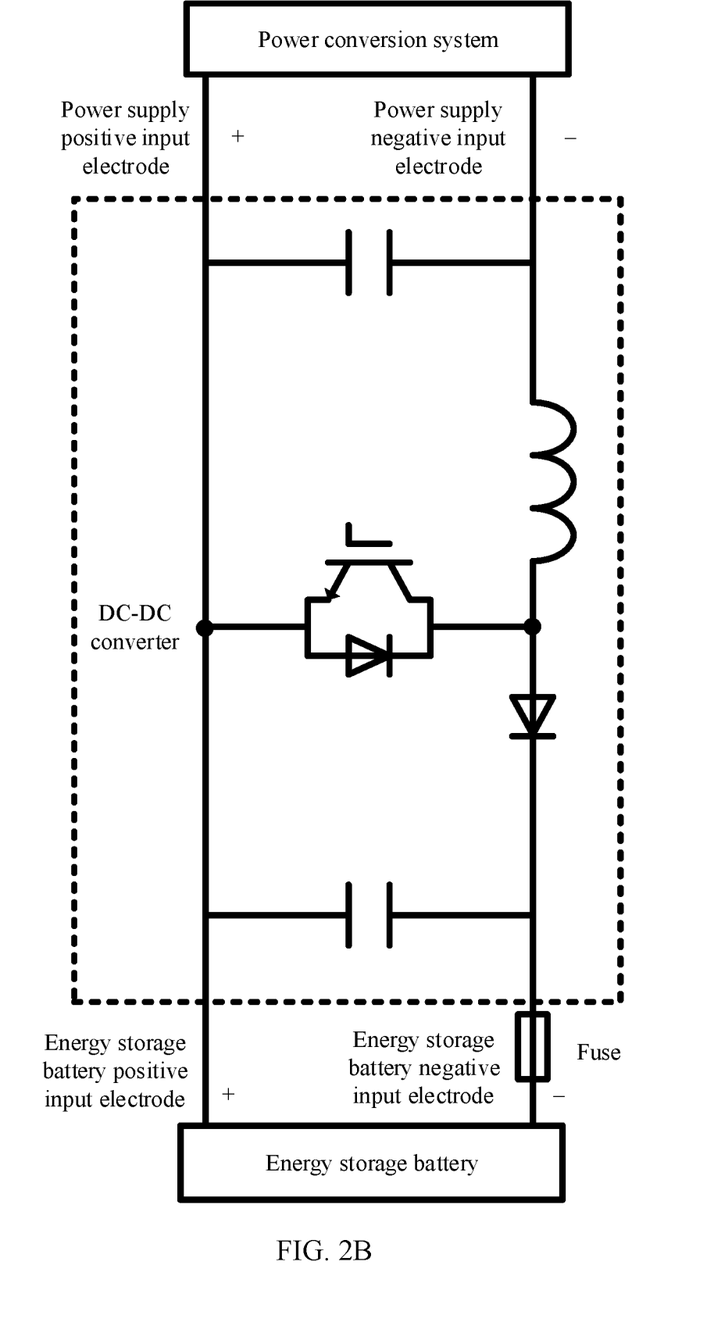
FIG. 2B is a schematic diagram of a structure of a direct current converter, according to some embodiments.

Using the MOSFET as an example, the control electrode of the switch device is a gate electrode, the first electrode of the switch device may be a source electrode of the switch device, and the second electrode may be a drain electrode of the switch device, or the first electrode may be the drain electrode of the switch device, and the second electrode may be the source electrode of the switch device. For example, FIG. 2B is a schematic diagram of a structure of a direct current converter. The direct current converter 204 may be a DC-DC converter, and is configured to control charge power of the energy storage battery 201 and discharge power of the energy storage battery 201. The DC-DC converter includes an energy storage battery positive input electrode, an energy storage battery negative input electrode, a power supply positive input electrode, and a power supply negative input electrode. The energy storage battery negative input electrode of the DC-DC converter is connected to a negative output electrode of the energy storage battery through a fuse (FU). The energy storage battery positive input electrode of the DC-DC converter is connected to the negative output electrode of the energy storage battery, and the power supply positive input electrode and the power supply negative input electrode of the DC-DC converter are connected to the power conversion system.

In addition, the direct current converter 204 may alternatively be a preconfigured power conversion circuit with a fixed current direction and current magnitude. For example, when the current direction is from the direct current converter 204 to the energy storage battery 201, the energy storage battery 201 may be charged. When the current direction is from the energy storage battery 201 to the direct current converter 204, the energy storage battery 201 may be discharged. The direct current converter 204 may adjust the charge power for charging by the power conversion system PCS 202 to specified charge power and provide the charge power to the energy storage battery 201. The direct current converter 204 may further adjust the discharge power for discharging the energy storage battery 201 to specified discharge power and provide the discharge power to the power conversion system PCS 202.

The sampling module 206 may include an input current sampling circuit configured to detect an input current of the energy storage battery 201, an input voltage sampling circuit configured to detect an input voltage of the energy storage battery 201, and an insulation detection circuit configured to detect grounding impedance of the direct current converter 204, and the sampling module 206 reports the input current of the energy storage battery, the input voltage of the energy storage battery, and the insulation impedance to ground of the direct current converter 204 to the monitoring module 205, so that the monitoring module 205 then forwards the input current of the energy storage battery, the input voltage of the energy storage battery, and the grounding impedance of the direct current converter 204 to the central monitoring unit 203. Further, the central monitoring unit 203 can implement central management on each energy storage battery 201 in the battery management system 200 based on the reported parameters. In addition, the sampling module 206 may further include an analog to digital converter (ADC), configured to convert analog quantities input by various detection circuits into digital quantities. A person skilled in the art should know that, and details are not described herein.

The monitoring module 205 may be a processor or a controller, for example, may be a general-purpose central processing unit (CPU), a general-purpose processor, a digital signal processor (DSP), an application specific integrated circuit (ASIC), a field programmable gate array (FPGA) or another programmable logic device, a transistor logic device, a hardware component, or any combination thereof. In some embodiments, the processor may be a combination of processors implementing a computing function, for example, a combination of one or more microprocessors, or a combination of a DSP and a microprocessor. The monitoring module 205 may receive sampling information sent by the sampling module 206, and forward the sampling information to the central monitoring unit 203. The central monitoring unit 203 may determine an SOX of the energy storage battery 201 based on the sampling information. After the SOX of the energy storage battery 201 is determined, power required by the energy storage battery 201 is determined. When the required charge power is greater than specified power, the direct current converter 204 may be controlled by using the monitoring module 205 to charge the energy storage battery 201. When it is determined that the charge power required by the energy storage battery 201 is less than or equal to the specified power, equalization charging may be performed between a plurality of energy storage batteries 201, to implement equalization between the energy storage batteries.

In some embodiments, the monitoring module 205 may control, by using the first control instruction, the direct current converter 204 to adjust the charge power for charging the energy storage battery 201 by the power conversion system PCS 202. The first control instruction is used to control the switch device in the direct current converter 204 to conduct and disconnect, so as to adjust the discharge power for discharging to the power conversion system PCS 202 to the target discharge power. When the central monitoring unit 203 determines that the charge power required by the energy storage battery 201 is greater than rated power, the target discharge power indicated by the first control instruction is greater than the rated power of the energy storage battery 201. When the central monitoring unit 203 determines that the charge power required by the energy storage battery 201 is less than or equal to the rated power, the target discharge power indicated by the first control instruction is less than or equal to the rated power of the energy storage battery 201; and equalization charging may be performed between the plurality of energy storage batteries 201. For example, the first control instruction may be a pulse width modulation (PWM) signal, and different duty cycles are set to adjust the discharge power for discharging to the power conversion system PCS 202 to the target discharge power. For example, a control instruction signal corresponding to the rated power for discharging the power conversion system PCS 202 to the energy storage battery 201 corresponds to PWM of a duty cycle: 50%. When the discharge power needs to be adjusted to be greater than the rated power, the first control instruction is PWM of a duty cycle greater than 50%. A specific manner of generating the first control instruction is not excessively limited herein, and a person skilled in the art should know that.

Because a common battery management system 200 usually includes a plurality of energy storage batteries 201 connected in series or in parallel, a problem of inconsistency usually occurs among the energy storage batteries 201, and the inconsistency includes: a difference between residual capacities of the energy storage batteries 201 is excessively large, a voltage difference is excessively large, and the like. In addition, the inconsistency between the energy storage batteries 201 may also be related to environments in which the different energy storage batteries 201 are located in addition to inconsistency generated during manufacturing of the energy storage batteries 201. If the problem of inconsistency is not resolved, performance and battery life of the energy storage batteries 201 are reduced. Therefore, equalization needs to be performed on the energy storage batteries 201, to ensure performance and battery life of the energy storage batteries 201.

For example, the battery management unit may first detect an SOC of each energy storage battery 201, and report the detected SOC of the energy storage battery 201 to the monitoring module 205. The monitoring module 205 reports the SOC of each energy storage battery 201 that is detected by the battery management unit to the central monitoring unit 203, and the central monitoring unit 203 calculates an average SOC of the energy storage batteries 201, to perform equalization on the energy storage batteries 201. In some embodiments, when equalization is performed on the energy storage batteries 201, only passive equalization may be used, only active equalization may be used, or the passive equalization and the active equalization may be implemented in combination. For example, an example in which the passive equalization and the active equalization are implemented in combination is as follows: When a difference between the SOC of the energy storage battery 201 and an average value of SOCs of the energy storage batteries 201 is less than a first battery level threshold, the central monitoring unit 203 does not deliver an equalization instruction, and does not perform any equalization adjustment on the SOC of the energy storage battery 201. When the difference between the SOC of the energy storage battery 201 and the average value of the SOCs of the energy storage batteries 201 is not less than the first battery level threshold and is less than a second battery level threshold, the central monitoring unit 203 delivers a passive equalization instruction. When the difference between the SOC of the energy storage battery 201 and the average value of the SOCs of the energy storage batteries 201 is not less than the second battery level threshold and is less than a third battery level threshold, an active equalization manner with a higher equalization speed and higher efficiency is selected. The central monitoring unit 203 delivers an active equalization instruction. The third battery level threshold is greater than the second battery level threshold, and the second battery level threshold is greater than the first battery level threshold. In addition, a sequence of performing active equalization may be further determined based on the SOC of each energy storage battery 201. The central monitoring unit 203 may perform sorting based on the difference between the SOC of each energy storage battery 201 and the average value of the SOCs of the energy storage batteries 201. A larger difference indicates a higher priority. The active equalization may be performed on the energy storage battery 201 with the highest priority, and the passive equalization may be performed on the other energy storage batteries 201.

When the central monitoring unit 203 delivers a passive equalization instruction to the energy storage battery, the central monitoring unit 203 may calculate a current battery capacity based on the SOC of the energy storage battery 201. A difference between battery capacities is obtained based on a difference between an SOC of a single energy storage battery and the average value of the SOCs of the energy storage batteries. Then, equalization time is calculated based on a fixed passive equalization current. During the active equalization, the difference between battery capacities is obtained based on the difference between the SOC of the single energy storage battery and the average value of the SOCs of the energy storage batteries. Then, a most proper equalization current is calculated based on a voltage of the energy storage battery and a total voltage of the energy storage batteries, to prolong service life of the energy storage battery, and further, different equalization currents may be used based on different battery capacities. A specific equalization current determining manner is not excessively described herein, and a person skilled in the art should know that.

In some embodiments, the monitoring module 205 is further configured to: receive a second control instruction sent by the central monitoring unit 203, and control, according to the second control instruction, the direct current converter 204 to adjust the discharge power for discharging the energy storage battery 201 to the power conversion system PCS 202 to the target discharge power.

In some embodiments, when determining that a working state of the energy storage battery 201 is a discharge state, the central monitoring unit 203 sends the second control instruction to the monitoring module 205, so that the direct current converter 204 adjusts the discharge power for discharging the energy storage battery 201 to the power conversion system PCS 202 to the target discharge power. In this way, in a discharge scenario, output power of the energy storage battery 201 is converted into charge power adapted to a to-be-charged device.

Figure 3:
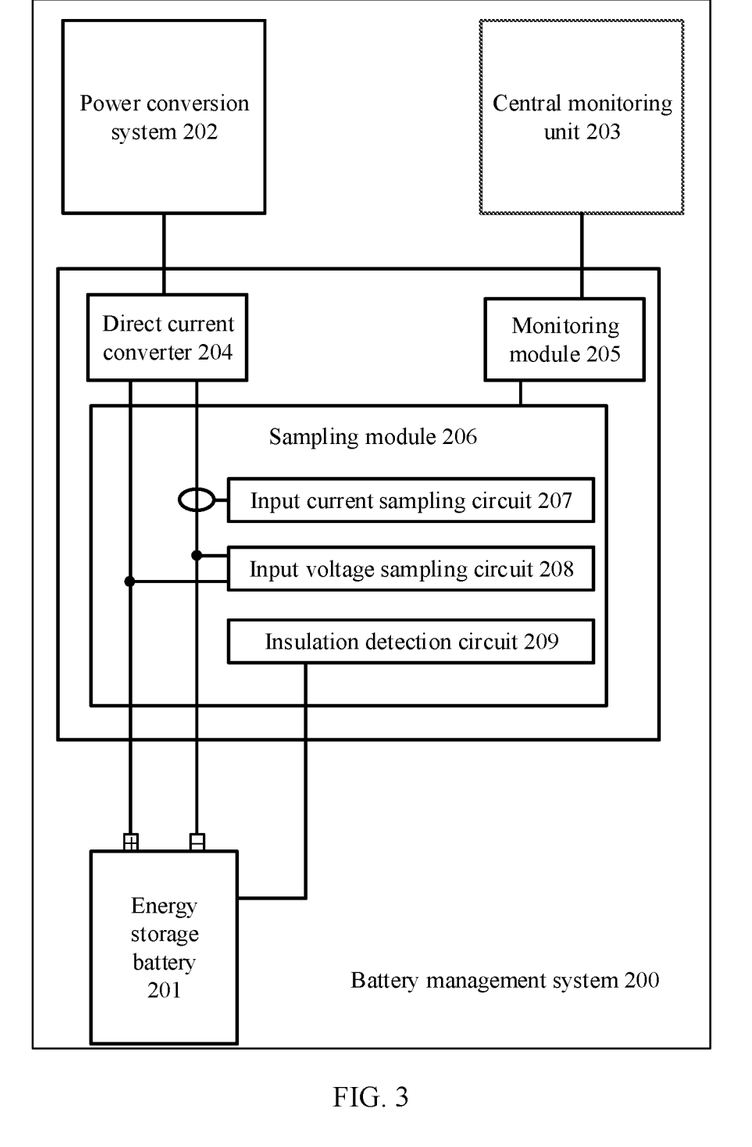
FIG. 3 is a schematic diagram of a structure of another battery management system, according to some embodiments.

In some embodiments, the target sampling information includes a current value of the energy storage battery 201 that is input by the direct current converter 204, a voltage value of the energy storage battery 201 that is input by the direct current converter 204, and insulation impedance of the energy storage battery 201. FIG. 3 is a schematic diagram of a structure of another battery management system 200. The sampling module 206 includes an input current sampling circuit 207, an input voltage sampling circuit 208, and an insulation detection circuit 209. The input current sampling circuit 207 is configured to collect the current value of the energy storage battery 201 that is input by the direct current converter 204. The input voltage sampling circuit 208 is configured to collect the voltage value of the energy storage battery 201 that is input by the direct current converter 204. The insulation detection circuit 209 is configured to collect the insulation impedance of the energy storage battery 201.

The input current sampling circuit 207 may include a current transformer (CT), and the current transformer is an instrument that converts a high current on a primary side into a low current on a secondary side based on an electromagnetic induction principle. The current transformer includes a closed iron core and a winding. The current transformer is sleeved on an electrical connection line between the direct current converter 204 and the energy storage battery 201, and a current of the electrical connection line is detected by using an electromagnetic mutual inductance principle. In some embodiments, a magnetic field is generated around the electrical connection line. After the current transformer is sleeved on the electrical connection line, a coil on the current transformer generates an induced current due to the magnetic field of the electrical connection line. After the induced current is amplified, the input current value of the energy storage battery 201 can be obtained. The direct current converter 204 includes a positive input terminal and a negative input terminal, and the input voltage sampling circuit 208 is coupled to the positive input terminal and the negative input terminal of the direct current converter 204, to obtain the input voltage value of the energy storage battery 201.

Figure 4:
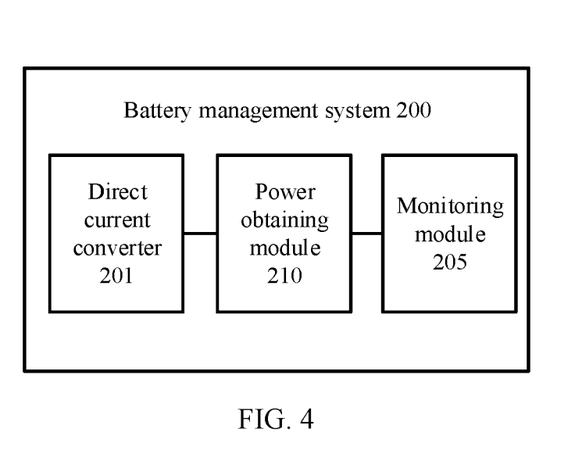
FIG. 4 is a schematic diagram of a structure of a battery management system including a power obtaining module, according to some embodiments.

In some embodiments, as shown in FIG. 4, the battery management system 200 may further include a power obtaining module 210. The power obtaining module 210 is configured to: generate an induced current based on an actual current in the direct current converter 204, generate a power supply current by using the induced current, and supply power to the monitoring module 205. The power obtaining module 210 includes a power obtaining transformer, configured to generate an induced current based on an actual current on the direct current converter 204. In addition, the power obtaining module 210 may further include a filter rectifier circuit, which first performs filter rectification on the induced current to obtain a power supply current, and provides the power supply current to the monitoring module 205.

Figure 5:
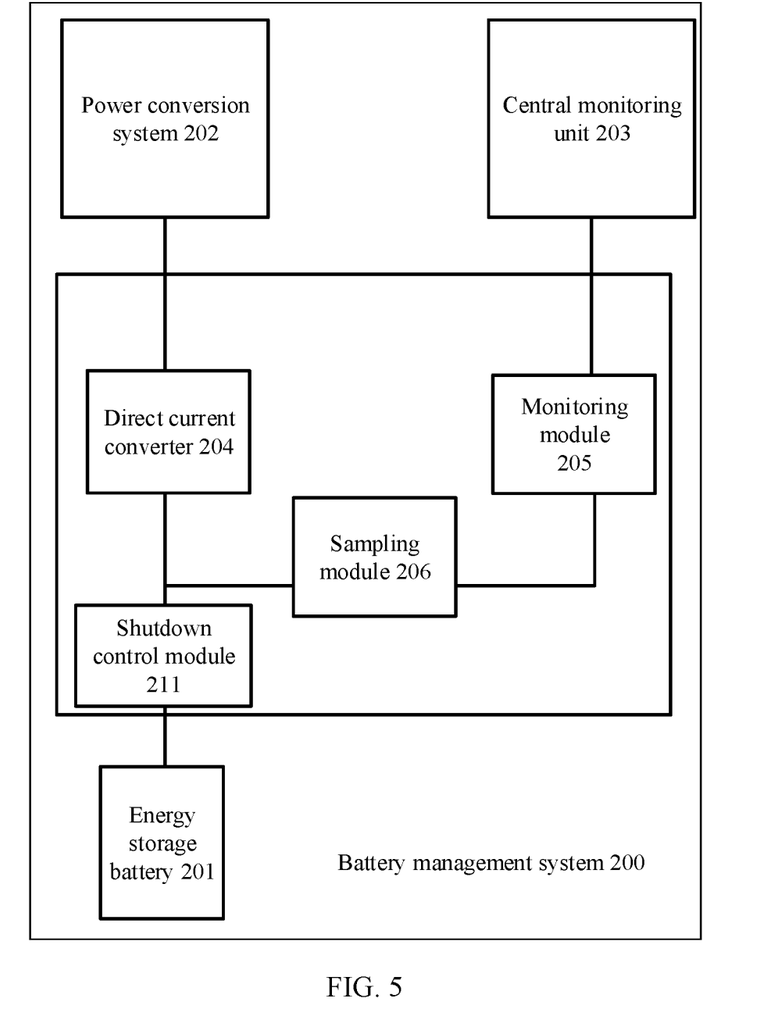
FIG. 5 is a schematic diagram of a structure of a battery management system including a monitoring module, according to some embodiments.

In some embodiments, as shown in FIG. 5, the battery management system 200 further includes a shutdown control module 211. The monitoring module 205 is further configured to: send a shutdown instruction to the shutdown control module 211 if the first control instruction sent by the central monitoring unit 203 is not received within target duration after the first sampling information is sent to the central monitoring unit 203. The shutdown control module 211 is configured to: break a connection between the direct current converter 204 and the energy storage battery 201 after receiving the shutdown instruction sent by the monitoring module 205. The shutdown control module 211 may include a control switch. The control switch is coupled between the direct current converter 204 and the energy storage battery 201. If the first control instruction sent by the central monitoring unit 203 is not received within the target duration, it indicates that a communications connection between the central monitoring unit 203 and the monitoring module 205 may be lost. In this case, the energy storage battery 201 is not controlled by the central monitoring unit 203, and the control switch needs to be disconnected, to protect the energy storage battery 201.

Figure 6:
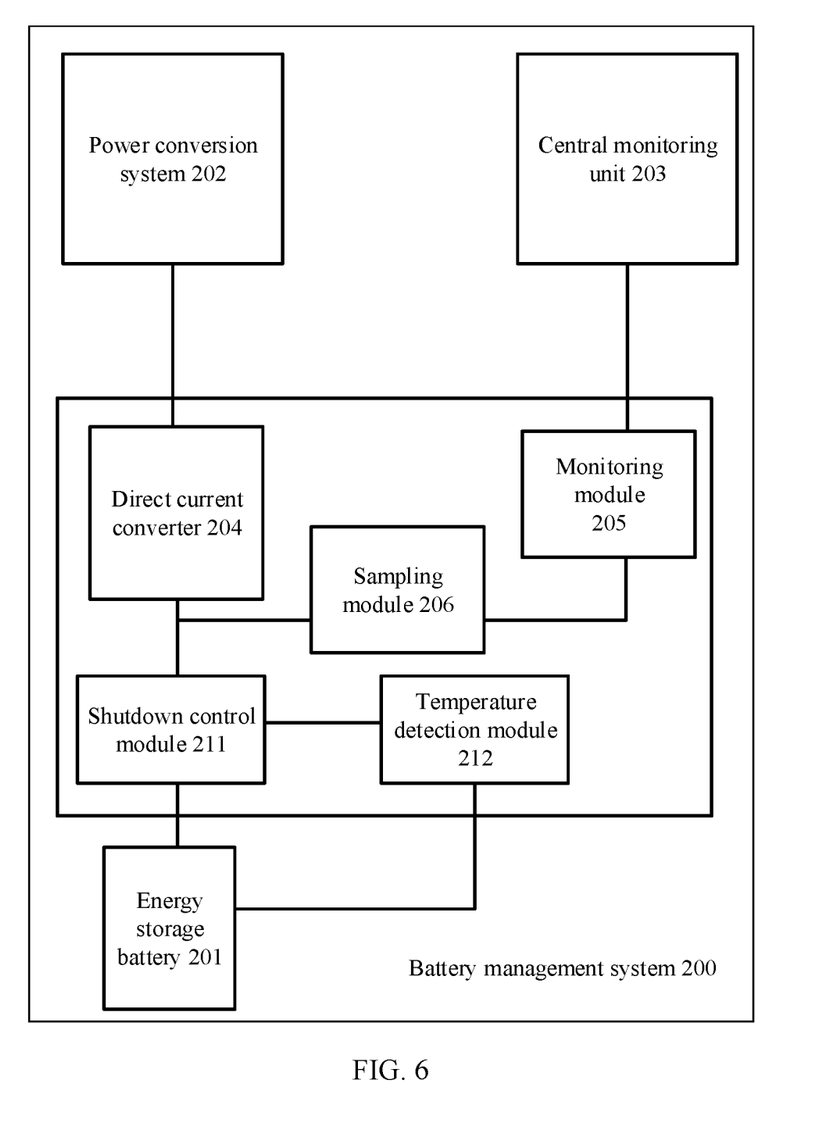
FIG. 6 is a schematic diagram of a structure of a battery management system including a temperature detection module, according to some embodiments.

In some embodiments, as shown in FIG. 6, the battery management system 200 further includes a temperature detection module 212. The temperature detection module 212 is configured to: detect a temperature of the energy storage battery 201 to obtain the temperature of the energy storage battery 201, and send the temperature of the energy storage battery 201 to the monitoring module 205; and the monitoring module 205 is further configured to send the shutdown instruction to the shutdown control module 211 when the temperature of the energy storage battery 201 is greater than a temperature threshold. In some embodiments, battery protection is started when the temperature of the energy storage battery 201 exceeds the temperature threshold, and the shutdown control module 211 sends the shutdown instruction, to protect the energy storage battery 201.

In some embodiments, the monitoring module 205 and the central monitoring unit 203 communicate with each other through any one of the following networks: a controller area network CAN and a fast Ethernet FE. In some embodiments, the monitoring module 205 may transmit data to the central monitoring unit 203 through the CAN or the fast Ethernet. In addition, the monitoring module 205 may also establish a connection to the central monitoring unit 203 in manners such as an RS485 interface, an optical fiber, power line communication (PLC) or 5G/4G/3G/2G networks, a general packet radio service (GPRS), wireless fidelity (Wi-Fi), Bluetooth, ZigBee, and infrared. A person skilled in the art should know that, and details are not described herein.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (e.g., including but not limited to a disk memory, a CD-ROM, an optical memory, and the like) that include computer usable program code.

This application is described with reference to the flowcharts and/or block diagrams of the method, the device (e.g., system), and the computer program product in this application. It should be understood that computer program instructions may be used to implement each process and/or each block in the flowcharts and/or the block diagrams and a combination of processes and/or blocks in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or any other programmable data processing device, so that a series of operations and operations are performed on the computer or the any other programmable device, thereby generating computer-implemented processing. Therefore, the instructions executed on the computer or the any other programmable device provide operations for implementing a specific function in one or more processes in the flowcharts and/or in one or more blocks in the block diagrams.

It is clear that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A battery management system, comprising: an energy storage battery, a power conversion system (PCS), a central monitoring unit, and a direct current converter, wherein the battery management system further comprises a monitoring circuit and a sampling circuit, an input terminal of the direct current converter is connected to the power conversion system (PCS), an output terminal of the direct current converter is connected to the energy storage battery;

the sampling circuit is configured to: perform sampling on an operating parameter of the direct current converter to obtain target sampling information, and send the target sampling information to the monitoring circuit; and the monitoring circuit is configured to: receive the target sampling information sent by the sampling circuit, and send the target sampling information to the central monitoring unit, so that the central monitoring unit determines, based on the target sampling information, target charge power for charging the energy storage battery by the PCS; and receive a first control instruction sent by the central monitoring unit, and control, according to the first control instruction, the direct current converter to adjust charge power for charging the energy storage battery by the PCS to the target charge power.

2. The battery management system of claim 1, wherein and the direct current converter, the sampling circuit, and the monitoring circuit are integrated on a same printed circuit board (PCB), and wherein the monitoring circuit is further configured to:
- receive a second control instruction sent by the central monitoring unit, and control, according to the second control instruction, the direct current converter to adjust discharge power for discharging the energy storage battery to the power conversion system (PCS) to target discharge power.

3. The battery management system of claim 1, wherein the target sampling information comprises a current value of the energy storage battery that is input by the direct current converter, a voltage value of the energy storage battery that is input by the direct current converter, and insulation impedance of the energy storage battery; and the sampling circuit comprises an input current sampling circuit, an input voltage sampling circuit, and an insulation detection circuit, wherein
- the input current sampling circuit is configured to collect the current value of the energy storage battery that is input by the direct current converter;
- the input voltage sampling circuit is configured to collect the voltage value of the energy storage battery that is input by the direct current converter; and
- the insulation detection circuit is configured to collect the insulation impedance of the energy storage battery.

4. The battery management system of claim 2, wherein the target sampling information comprises a current value of the energy storage battery that is input by the direct current converter, a voltage value of the energy storage battery that is input by the direct current converter, and insulation impedance of the energy storage battery; and the sampling circuit comprises an input current sampling circuit, an input voltage sampling circuit, and an insulation detection circuit, wherein
- the input current sampling circuit is configured to collect the current value of the energy storage battery that is input by the direct current converter;
- the input voltage sampling circuit is configured to collect the voltage value of the energy storage battery that is input by the direct current converter; and
- the insulation detection circuit is configured to collect the insulation impedance of the energy storage battery.

5. The battery management system of claim 1, wherein the battery management system further comprises a power obtaining circuit, wherein
- the power obtaining circuit is configured to: generate an induced current based on an actual current in the direct current converter, generate a power supply current by using the induced current, and supply power to the monitoring circuit.

6. The battery management system of claim 2, wherein the battery management system further comprises a power obtaining circuit, wherein
- the power obtaining circuit is configured to: generate an induced current based on an actual current in the direct current converter, generate a power supply current by using the induced current, and supply power to the monitoring circuit.

7. The battery management system of claim 3, wherein the battery management system further comprises a power obtaining circuit, wherein
- the power obtaining circuit is configured to: generate an induced current based on an actual current in the direct current converter, generate a power supply current by using the induced current, and supply power to the monitoring circuit.

8. The battery management system of claim 1, wherein the battery management system further comprises a shutdown control circuit, wherein
- the monitoring circuit is further configured to send a shutdown instruction to the shutdown control circuit if the first control instruction sent by the central monitoring unit is not received within target duration after the target sampling information is sent to the central monitoring unit; and
- the shutdown control circuit is configured to break a connection between the direct current converter and the energy storage battery after receiving the shutdown instruction sent by the monitoring circuit.

9. The battery management system of claim 2, wherein the battery management system further comprises a shutdown control circuit, wherein
- the monitoring circuit is further configured to send a shutdown instruction to the shutdown control circuit if the first control instruction sent by the central monitoring unit is not received within target duration after the target sampling information is sent to the central monitoring unit; and
- the shutdown control circuit is configured to break a connection between the direct current converter and the energy storage battery after receiving the shutdown instruction sent by the monitoring circuit.

10. The battery management system of claim 3, wherein the battery management system further comprises a shutdown control circuit, wherein
- the monitoring circuit is further configured to send a shutdown instruction to the shutdown control circuit if the first control instruction sent by the central monitoring unit is not received within target duration after the target sampling information is sent to the central monitoring unit; and
- the shutdown control circuit is configured to break a connection between the direct current converter and the energy storage battery after receiving the shutdown instruction sent by the monitoring circuit.

11. The battery management system of claim 4, wherein the battery management system further comprises a shutdown control circuit, wherein
- the monitoring circuit is further configured to send a shutdown instruction to the shutdown control circuit if the first control instruction sent by the central monitoring unit is not received within target duration after the target sampling information is sent to the central monitoring unit; and
- the shutdown control circuit is configured to break a connection between the direct current converter and the energy storage battery after receiving the shutdown instruction sent by the monitoring circuit.

12. The battery management system of claim 8, wherein the battery management system further comprises a temperature detection circuit, wherein
- the temperature detection circuit is configured to: detect a temperature of the energy storage battery to obtain the temperature of the energy storage battery, and send the temperature of the energy storage battery to the monitoring circuit; and
- the monitoring circuit is further configured to send the shutdown instruction to the shutdown control circuit when the temperature of the energy storage battery is greater than a temperature threshold.

13. The battery management system of claim 9, wherein the battery management system further comprises a temperature detection circuit, wherein
the temperature detection circuit is configured to: detect a temperature of the energy storage battery to obtain the temperature of the energy storage battery, and send the temperature of the energy storage battery to the monitoring circuit; and
the monitoring circuit is further configured to send the shutdown instruction to the shutdown control circuit when the temperature of the energy storage battery is greater than a temperature threshold.

14. The battery management system of claim 10, wherein the battery management system further comprises a temperature detection circuit, wherein
the temperature detection circuit is configured to: detect a temperature of the energy storage battery to obtain the temperature of the energy storage battery, and send the temperature of the energy storage battery to the monitoring circuit; and
the monitoring circuit is further configured to send the shutdown instruction to the shutdown control circuit when the temperature of the energy storage battery is greater than a temperature threshold.

15. The battery management system of claim 11, wherein the battery management system further comprises a temperature detection circuit, wherein
the temperature detection circuit is configured to: detect a temperature of the energy storage battery to obtain the temperature of the energy storage battery, and send the temperature of the energy storage battery to the monitoring circuit; and
the monitoring circuit is further configured to send the shutdown instruction to the shutdown control circuit when the temperature of the energy storage battery is greater than a temperature threshold.

16. The battery management system of claim 8, wherein the battery management system further comprises a battery voltage detection circuit, wherein
the battery voltage detection circuit is configured to: detect a voltage of the energy storage battery to obtain the voltage of the energy storage battery, and send the voltage of the energy storage battery to the monitoring circuit; and
the monitoring circuit is further configured to send the shutdown instruction to the shutdown control circuit when the voltage of the energy storage battery is not within a preset voltage range.

17. The battery management system of claim 9, wherein the battery management system further comprises a battery voltage detection circuit, wherein
the battery voltage detection circuit is configured to: detect a voltage of the energy storage battery to obtain the voltage of the energy storage battery, and send the voltage of the energy storage battery to the monitoring circuit; and
the monitoring circuit is further configured to send the shutdown instruction to the shutdown control circuit when the voltage of the energy storage battery is not within a preset voltage range.

18. The battery management system of claim 10, wherein the battery management system further comprises a battery voltage detection circuit, wherein
the battery voltage detection circuit is configured to: detect a voltage of the energy storage battery to obtain the voltage of the energy storage battery, and send the voltage of the energy storage battery to the monitoring circuit; and
the monitoring circuit is further configured to send the shutdown instruction to the shutdown control circuit when the voltage of the energy storage battery is not within a preset voltage range.

19. The battery management system of claim 11, wherein the battery management system further comprises a battery voltage detection circuit, wherein
the battery voltage detection circuit is configured to: detect a voltage of the energy storage battery to obtain the voltage of the energy storage battery, and send the voltage of the energy storage battery to the monitoring circuit; and
the monitoring circuit is further configured to send the shutdown instruction to the shutdown control circuit when the voltage of the energy storage battery is not within a preset voltage range.

20. The battery management system of claim 1, wherein the monitoring circuit and the central monitoring unit communicate with each other through any one of the following networks: a controller area network (CAN) and a fast Ethernet (FE).

* * * * *